United States Patent [19]

Grob et al.

[11] Patent Number: 4,974,501
[45] Date of Patent: Dec. 4, 1990

[54] DEEP FAT FRYING APPARATUS WITH IMPROVED UNDER-FRYER COOKING LIQUID PUMPING AND FILTRATION SYSTEM

[75] Inventors: James T. Grob; John M. Kinch, both of Shreveport, La.

[73] Assignee: The Frymaster Corporation, Shreveport, La.

[21] Appl. No.: 483,321

[22] Filed: Feb. 20, 1990

Related U.S. Application Data

[63] Continuation of Ser. No. 416,928, Oct. 4, 1989, abandoned, which is a continuation-in-part of Ser. No. 168,164, Mar. 15, 1988, Pat. No. 4,890,548.

[51] Int. Cl.$^5$ ............................................. A47J 37/12
[52] U.S. Cl. ..................................... 99/408; 99/330; 99/418; 210/DIG. 8
[58] Field of Search ................................. 99/327–330, 99/331, 337, 403, 408, 418, 342; 214/437, 509, 327; 210/184–186, 175, DIG. 8, 167

[56] References Cited

U.S. PATENT DOCUMENTS

| | | | |
|---|---|---|---|
| 4,195,667 | 4/1980 | Moore et al. | 137/637.1 |
| 4,210,123 | 7/1980 | Moore et al. | 126/374 |
| 4,210,177 | 7/1980 | Moore et al. | 137/613 |
| 4,259,567 | 3/1981 | Moore et al. | 219/327 |
| 4,324,173 | 4/1982 | Moore et al. | 99/330 |
| 4,420,006 | 12/1983 | Moore et al. | 134/167 |
| 4,444,095 | 4/1984 | Anetsberger et al. | 99/408 |
| 4,623,544 | 11/1986 | Highnote | 99/330 |
| 4,643,824 | 2/1987 | Akazawa et al. | 210/167 |
| 4,684,412 | 8/1987 | Fritzsche | 99/330 |
| 4,702,827 | 10/1987 | Wenzel | 210/117 |

Primary Examiner—Timothy F. Simone
Attorney, Agent, or Firm—Hubbard, Thurman, Turner, Tucker & Harris

[57] ABSTRACT

A deep fat fryer structure includes a floor mounted housing having an upper internal portion in which a side-by-side pair of large capacity metal frypots are operatively supported, each of the frypots having an upper, heated cooking portion from which an unheated well depends. Cooking liquid may be drained from the wells for filtration purposes by a valved drainage conduit system having an open outlet end. Filtered cooking liquid may be returned to the upper frypot portions, or their depending cold wells, through a valved supply conduit system connected to the outlet of a height-adjustable filtration pump disposed within a lower rear portion of the housing. An open-topped, wheel supported overflow pan nestingly receives an open-topped cooking liquid receiving container and may be rolled into the housing directly beneath the frypots to receive cooking liquid drained therefrom, the receiving container having a filtration structure supported on its bottom wall. Aligned outlet openings in the bottom walls of the overflow pan in the receiving container are sealingly communicated by interenagable O-ring slip fitting members which permit cooking liquid downflow through the outlet openings into a drain sump secured to the bottom of the overflow pan. Secured to the drain sump is a transfer pipe having an outer end provided with a quick disconnect fitting member which, when the overflow pan is rolled into the housing, is brought into automatic coupling engagement with a mating quick disconnect fitting on the filtration pump inlet. When the cooking filtration process is completed, the overflow pan may be rolled out of the housing, and the receiving container lifted out of the overflow pan to permit easy access to the filter structure for cleaning thereof. The entire filtration system requires no more floor space than that occupied by the frypot housing.

20 Claims, 4 Drawing Sheets 4,974,501

DEEP FAT FRYING APPARATUS WITH IMPROVED UNDER-FRYER COOKING LIQUID PUMPING AND FILTRATION SYSTEM

CROSS-REFERENCE TO RELATED APPLICATION

This is a continuation, of application Ser. No. 416,928, filed Oct. 4, 1989, now abandoned, which is a continuation-in-part of U.S. application Ser. No. 168,164 filed on Mar. 15, 1988, now U. S. Pat. No. 4,890,598 and entitled "DEEP FAT FRYING APPARATUS HAVING AN IMPROVED COOKING FLUID FILTRATION SYSTEM", such prior application being hereby incorporated by reference herein.

BACKGROUND OF THE INVENTION

The present invention relates generally to cooking equipment and, in a preferred embodiment thereof, more particularly provides deep fat frying apparatus having an improved under-fryer cooking liquid filtration and pumping system.

The frying in commercial cooking facilities of various food items such as french fries, breaded chicken and fish and the like is conventionally performed using fryer structures that typically comprise at least two large capacity metal frypots operatively supported within an upper portion of a suitable housing. Each of the frypots has a heated upper portion, in which the food is actually fried in a cooking liquid such as oil or melted lard, and an elongated, unheated "cold well" portion which depends from the upper frypot portion and is designed to receive and retain food bits that inevitably fall from the fryer racks. The relatively cooler temperature of the cooking fluid in the unheated wells tends to prevent the fallen food particles from burning and thereby unduly hastening the need to replace the cooking liquid in the frypots with a fresh supply.

It is well known that the useful life of a given batch of cooking liquid may be further extended by periodically draining the oil, filtering the particulate food matter from the drained liquid, and then returning the cleansed liquid to its frypot for further food frying use. Heretofore, the equipment needed to effect this very advantageous filtration process has required a considerable amount of additional operational and/or storage floor space beyond that occupied by the fryer housing, the housing floor space normally being only somewhat greater than the vertically projected floor area of the large capacity frypots. As an example, it has been conventional practice to position the filtration and associated pumping equipment in a separate floor mounted filtration housing built onto one side of the frypot housing. Not only does this require a significant amount of floor space, which is usually at a high premium in most commercial cooking facilities such as fast food restaurants, but also inhibits the ability to add additional frypot sections to the existing frypot housing should business expand or frying needs otherwise increase.

The cooking liquid filtration and pumping system illustrated and described in the aforementioned copending U.S. application Ser. No. 168,164 now U.S. Pat. No. 4,890,548, substantially solves this floor space problem by providing a roll-in cooking fluid receiving container which may be positioned beneath the dual, large capacity frypots and is sized to hold the entire cooking liquid content drained from either of them. A cooking liquid filtration pump is supported on the receiving container for movement therewith, and has a quick disconnect fitting on its outlet which may be coupled to the supply conduit system used to flow cooking liquid drained from the rolled-in container and discharged from the pump outlet. Cooking liquid drained from one of the frypots into the roll-in container is cleaned by a filter structure disposed within the container as the drained cooking liquid is drawn from the container and flowed back into the frypot through the filtration pump and its associated supply conduit system.

In further developing this roll-in filtration/pumping system, it has become desirable to provide it with further improvements relating, for example, to filter cleaning access, quick connection of the pump to the supply conduit system, cooking liquid supply to the frypots, and the like. It is accordingly an object of the present invention to provide deep fat frying apparatus having an under-fryer cooking liquid filtration and pumping system into which these and other further improvements are incorporated.

SUMMARY OF THE INVENTION

In carrying out the principles of the present invention, in accordance with a preferred embodiment thereof, deep fat fryer apparatus is provided which has an improved cooking fluid filtration system that requires no additional floor space, is of an economical and quite simple construction, provides improved operational safety, and further provides ready access to its filtering and pumping components for maintenance and cleaning purposes.

The apparatus includes a floor mounted housing having an open lower end, a lower internal portion, an upper internal portion directly above and in communication with the lower internal portion, and means for defining a horizontally facing front access opening to the lower internal housing portion, the access opening extending from the floor to the upper end of the lower internal housing portion.

A pair of large capacity metal frypots are operatively supported side-by-side within the upper internal housing portion, each of the frypots having a heated upper portion, in which food is supported on a rack or the like and fried in a cooking liquid such as oil or melted lard, and an elongated, unheated "cold well" portion depending therefrom.

To periodically drain the cooking liquid from a selected one of the frypots for filtration purposes, a suitably valved drainage conduit system is disposed within the upper internal housing portion and has an inlet portion operatively connected to each of the frypots wells, and a discharge opening positioned between and slightly below the wells. Return of filtered cooking fluid to the drained frypot is effected through a supply conduit system disposed in the upper internal housing portion and having supply valves connected therein and operative to selectively flow the returned cooking liquid to either the upper portion or the lower cold well portion of each of the frypots.

The improved cooking fluid filtration system of the present invention includes a wheel-supported overflow pan having a top opening, a bottom wall having an outlet opening formed therethrough, and a drain sump secured to the bottom wall over its outlet opening. An open-topped cooking liquid receiving container is downwardly insertable into the overflow pan, and has a bottom wall with an outlet opening therein. Interengagable O-ring slip fitting are secured to the container and overflow pan bottom walls at the outlet openings therein, and are operative to prevent cooking liquid outflow from within the container into the overflow pan when the container is operatively inserted thereinto.

Lift-out filter means are positioned along the bottom wall of the cooking liquid receiving container and are operative to filter cooking liquid flowing downwardly through the container outlet opening into the drain sump of the overflow pan. An end of a rigid transfer pipe is secured to the overflow pan drain sump and extends along the rear side of the overflow pan to adjacent its top end. The opposite end of the transfer pipe has connected thereto a rearwardly facing quick disconnect fitting portion.

A cooking liquid filtration pump, having an outlet and an inlet, is supported within a lower rear portion of the housing upon a support structure whose height within the housing may be selectively adjusted. The outlet of the pump is operatively connected to the supply conduit system, and the inlet of the pump is provided with a forwardly facing quick disconnect fitting portion which may be removably coupled to the quick disconnect fitting portion on the transfer pipe.

To ready the fryer apparatus for the draining a filtration of its frypot cooking liquid, the overflow pan, with the cooking liquid receiving container operatively received therein, is simply rearwardly rolled rearwardly along the floor through the housing access opening into the lower internal housing portion to an operating position in which the container is disposed directly beneath the frypots, and the open top of the container is positioned beneath the outlet of the drainage conduit system to receive cooking liquid drained therethrough.

The quick disconnect fitting portions of the transfer pipe and the filtration pump inlet are generally positioned relative to one another such that when the overflow pan is rolled rearwardly into the housing through the access opening, they are automatically brought into coupling engagement. The relative alignment between these mating quick disconnect fitting portions is facilitated in the present invention by the vertical adjustment capabilities of the filtration pump, which provides for vertical alignment between the quick disconnect fitting portions, and guide rail means carried by the housing and operative to engage opposite side portions of the overflow pan as it is being rolled rearwardly into the access opening, to provide horizontal alignment between the quick disconnect fitting portions.

Minor deviations from this horizontal and vertical alignment are compensated for by a flared guide fitting secured to one of the disconnect fitting portions and operative to receive and guide the other disconnect fitting portion into coupling engagement with the disconnect fitting portion to which the guide fitting is secured, during rearward movement of the overflow pan into the housing through the access opening.

Accordingly, all that is necessary to operatively connect the filtration pump to the drain sump on the overflow pan is to roll the overflow pan rearwardly into the housing until the mating disconnect fitting portions are brought into coupling engagement. When the overflow pan is rolled forwardly out of the housing, these disconnect fitting portions are simply pulled apart. To prevent undesirable outflow of cooking liquid through the transfer pipe when the disconnect fitting portions are uncoupled, the transfer pipe disconnect fitting portion is preferably positioned above the maximum anticpated cooking liquid level within the cooking liquid receiving container.

After the nested overflow pan and cooking liquid receiving container are rearwardly rolled to their operating positions within the housing, cooking liquid from within a selected one of the frypots may be drained into the receiving container through the valved drainage conduit system, the received fluid flowing downwardly through the filter means into the drain sump on the lower wall of the overflow pan, the filter means removing from received fluid the particulate food matter suspended therein. Filtered cooking liquid entering the drain sump is pumped upwardly into the drained frypot through the valved supply conduit system, thereby readying the refilled frypot for a subsequent cooking cycle with its now essentially food particulate-free batch of cooking liquid. The cooking liquid in the other frypot may be then be drained, filtered and returned in a similar fashion.

To further enhance the overall filtering process, a conventional drop-in food dislodgment shower device is provided that is adapted to be removably secured within the open upper end of the frypot to which cooking fluid is being returned by the filtration pump. With the supply valve associated with the frypot in which the shower device is positioned moved to a first flow position, the returning cooking liquid is returned, at the upper portion of the frypot, to an inlet portion of the shower device which may be quick-connected to an outlet of the supply conduit system at its upper entry to the frypot, the shower device having a discharge header portion configured to extend around the inner periphery of the frypot adjacent its open upper end. Cooking liquid returned to the upper portion of the frypot through the supply conduit system is forced downwardly through small, spaced discharge opening formed around the undersurface periphery of the header, thereby forming a series of downwardly directed cooking liquid jets. These jets sweep along the vertical interior side surfaces of the frypot's upper cooking portion and dislodge adhered food particles therefrom so that they can be flowed to filter means in the receiving container.

After this showering process has been completed, the frypot's supply valve may be moved to its second flow position in which the pump cooking liquid returned to the frypot is flowed into the frypot's well portion to further clean such well portion.

In a preferred embodiment of the present invention, the aforementioned drainage conduit system includes a drainage header positioned generally forwardly of the frypot well portions, and the supply conduit system includes a horizontal header portion positioned generally rearwardly of the well portions, the supply valves also being positioned adjacent rear ends of the cold wells. The supply valves are provided with forwardly projecting, rotatable actuating portions which may be turned to move each particular valve between a first flow position in which the returning cooking liquid is flowed to the upper portion of the frypot, an off position, and a second flow position in which the returning cooking fluid is flowed into the frypot's cold well.

To conveniently adjust each of the supply valves, mechanically linkage means are extended from each of the valve actuating portions and are secured to the forwardly disposed drain header. In a preferred embodiment of the present invention, such mechanical linkage means include two rotatably mounted levers secured to the drainage header, and elongated rod means interconnected between the levers and the valve actuating portions for transferring rotational motion from the levers to the valve actuating portions.

The improved cooking liquid filtration and pumping system of the present invention permits rapid connection therein, and removal therefrom, of the pan and container filtration portion of the system due to the interengageable engagable disconnect fitting portions on the transfer pipe and the filtration pump inlet. The invention also provides for improved filter cleaning access, since when the overflow pan is rolled rearwardly outwardly from the housing, rapid access to the filter means is achieved simply by lifting the cooking liquid receiving container upwardly from the overflow pan. Additionally, improved removal of particulate food matter from within the frypots during the filtering process is achieved by means of the ability to selectively flow the returning cooking liquid to either the upper cooking portion of a selected frypot, and through the shower system positioned therein, or directly into the cold well portion of the frypot.

DETAILED DESCRIPTION

Figure 1:
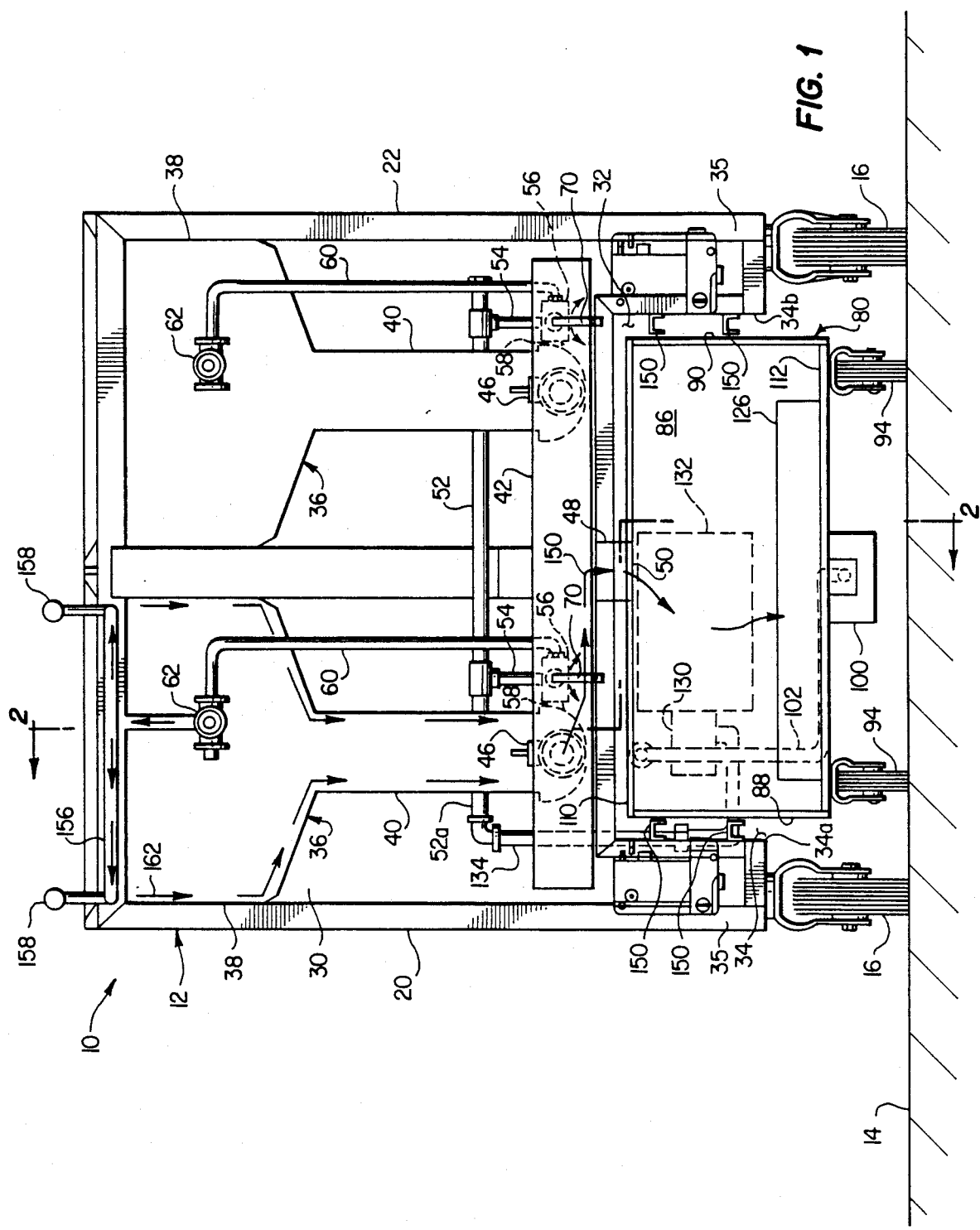
FIG. 1 is a simplified, somewhat schematic front cross-sectional view through a deep fat fryer apparatus which embodies principles of the present invention and is provided with an improved under-fryer cooking fluid filtration and pumping system.
Figure 2:
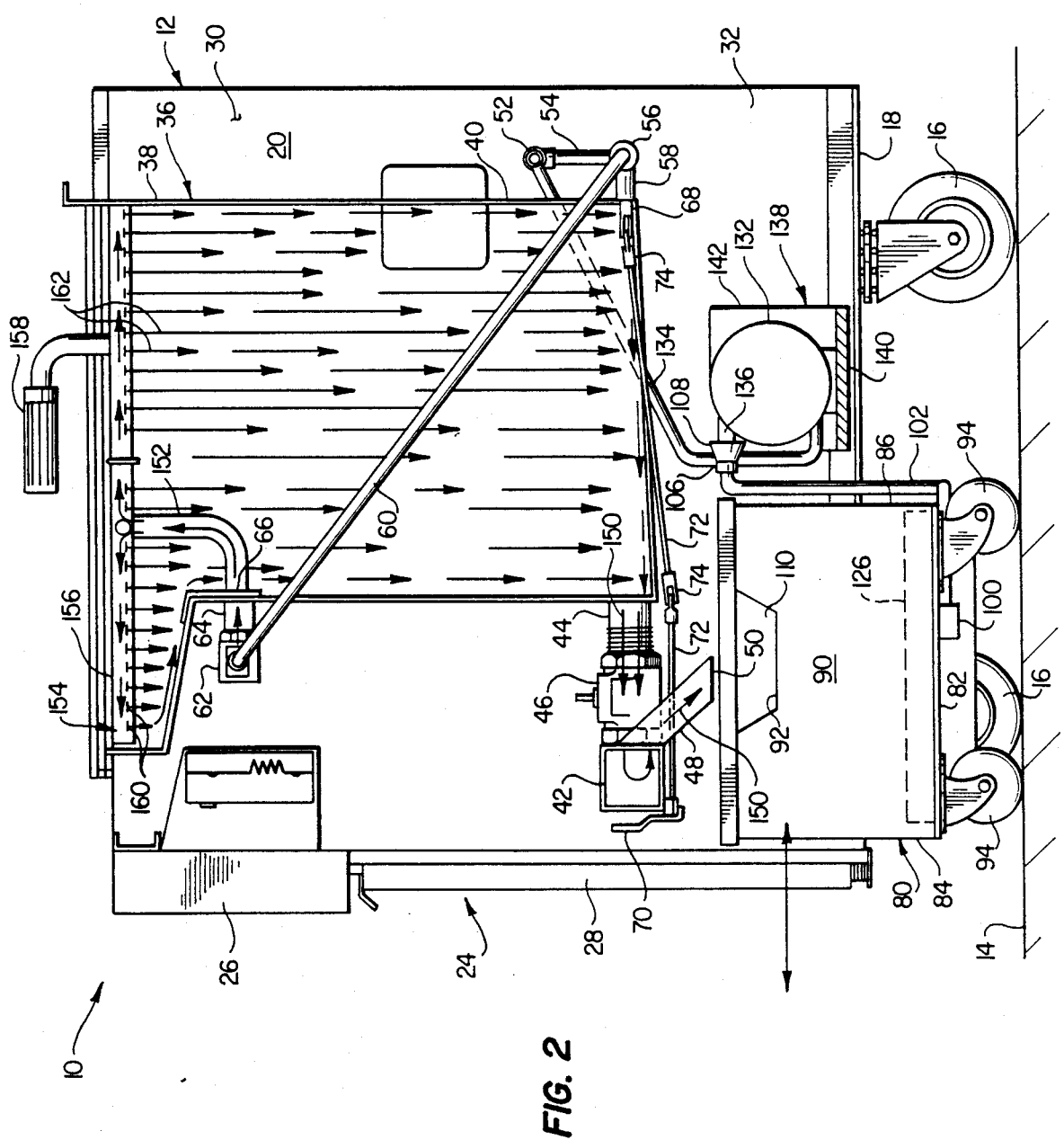
FIG. 2 is a cross-sectional view through the apparatus, partially in elevation, taken generally along line 2—2 of FIG. 1.

As illustrated in FIGS. 1 and 2, the present invention provides a deep fat frying apparatus 10 having incorporated therein a unique cooking liquid filtration and pumping system to be subsequently described. Apparatus 10 includes a metal housing 12 which is supportable on a floor 14 by wheels 16 so that the housing can be conveniently rolled from one operating location to another. Housing 12 has an elevated, open lower end 18, left and right side walls 20, 22 (as viewed from the front), and a front side wall portion 24 defined by a side-by-side pair of top mounted control panels 26, and a pair of front access doors 26 disposed beneath the control panels. The housing 12 has an upper internal portion 30 and a lower internal portion 32.

With the housing doors 28 in their open position, an access opening or passage 34 is defined, such access opening extending vertically from the floor 14 to the upper end of the lower internal housing portion, rearwardly through the housing 12, and horizontally across most of the interior width of the housing. As illustrated in FIG. 1, the access passage 34 extends horizontally, in a left-to-right direction, between inner side surfaces $34_a$ and $34_b$ of downwardly extending lower left and right side portions 35 of the housing.

Operatively supported in the upper internal housing portion 30 are a side-by-side pair of open-topped, large capacity metal frypots 36 which are adapted to receive a quantity of cooking liquid such as cooking oil or melted lard. Each of the frypots 36 has a heated, upper cooking portion 38 from which a vertically elongated, laterally narrower cold well portion 40 depends. For purposes illustrative clarity, the frypot heating system, which is of a conventional construction, has not been shown in the drawings, but it will be appreciated that such heating system could be of either a gas heating or electric heating type.

The improved apparatus 10 is also provided with a drainage conduit system for draining cooking liquid from a selected one of the frypots 36 for a cooking liquid filtration process subsequently described herein. The drainage conduit system includes an elongated, generally horizontally disposed hollow drain header 42 which is positioned in the upper internal housing portion 30 forwardly of the lower ends of the cold wells 40. Drain header 42 has a rectangular cross-section and is operatively connected to the cold wells 40 by drain pipe sections 44 which are connected to the lower ends of the cold wells and are provided with suitable drain valves 46 that may be conventionally operated to drain the cooking liquid from either of the frypots 36 into the drain header 42. An outlet conduit 48 is connected to a longitudinally central portion of the drain header 42, slopes rearwardly and downwardly therefrom, and has a open discharge end 50.

Also positioned within the upper internal housing portion 30, generally rearwardly of the frypot cold wells 40, is a supply conduit system which, in a manner subsequently described, is used to return filtered cooking liquid to the frypots. The supply conduit system includes a horizontal supply pipe header 52 which is connected by branch pipes 54 to a pair of three-way supply valves 56 each positioned adjacent the rear end of one of the cold wells 40. For purposes later described, each of the supply valves 56 has two outlets—one of which is connected via a branch pipe 58 to the rear end of its associated cold well 40, the other of which is connected via a forwardly and upwardly sloping branch pipe 60 to a return valve 62 mounted on a branch pipe 64 secured to the upper frypot portion 38 at a quick-disconnect fitting 66. The return valves 62 are operable in a conventional fashion to route filtered cooking liquid into a selected one of the upper frypot portions 38.

As illustrated in FIG. 2, each of the supply valves 56 is provided with a forwardly facing actuating portion 68 which may be rotated between a first flow position which routes fluid entering the valve inlet to the frypot cold well to through the first valve outlet, an off position in which fluid flow through the valve is precluded, and a second flow position in which fluid flow through the valve inlet is flowed upwardly through the branch pipe 60.

Figure 4:
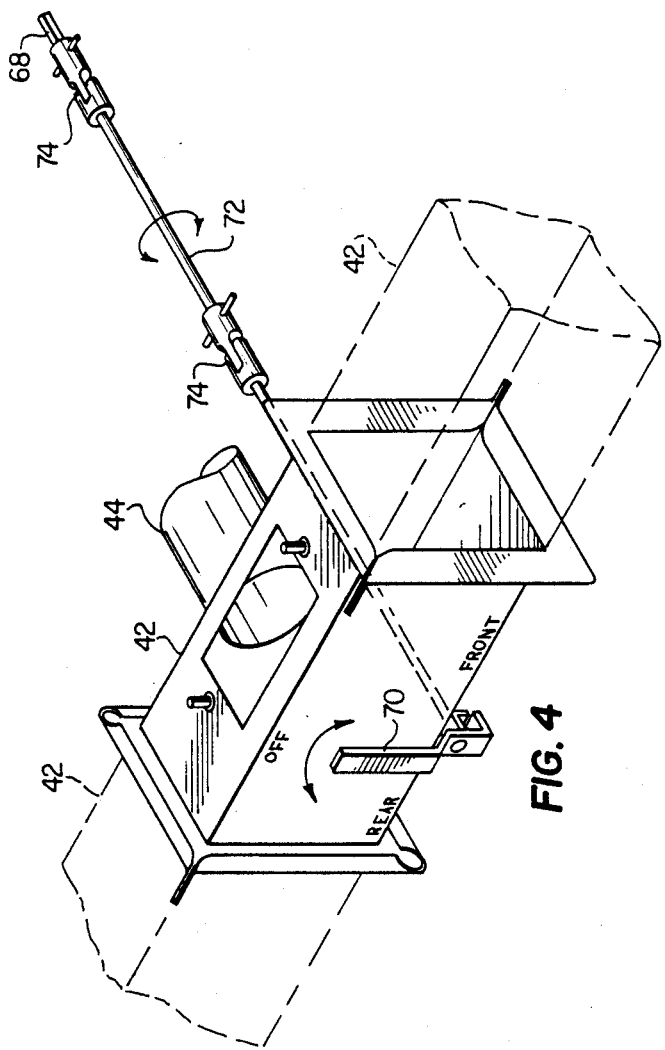
FIG. 4. is a perspective view of a remote valve control structure mounted on a drain header portion of the deep fat fryer apparatus.

Referring now to FIGS. 1, 2 and 4, each of the supply valve actuating portions 68 may be manually rotated by means of mechanical linkage means interconnected between the actuating portion 68 and a control lever 70 mounted on the drain header 42 for pivotal movement between the "rear", "off", and "front" positions indicated in FIG. 4.

The linkage means for each of the supply valves 56 includes an elongated rod member 72, having a pair of universal joints 74 installed therein, which is secured at its opposite ends to an actuating portion 68 and a lever 70. Each rod member 72 functions to transmit the rotational motion of its associated lever 70 to its associated supply valve actuating portion 68. Accordingly, when one of the levers 70 is pivoted to its "rear" position, its associated supply valve is operative to flow cooking liquid from the supply conduit system into the rear bottom end of its associated frypot cold well, and when the lever 70 is pivoted to its "front" position, its associated supply valve is operative to flow cooking fluid from the supply conduit system into the top front portion of its associated upper frypot cooking section. When the lever 70 is pivoted to its central "off" position, cooking liquid inflow to its associated frypot is terminated.

Figure 3:
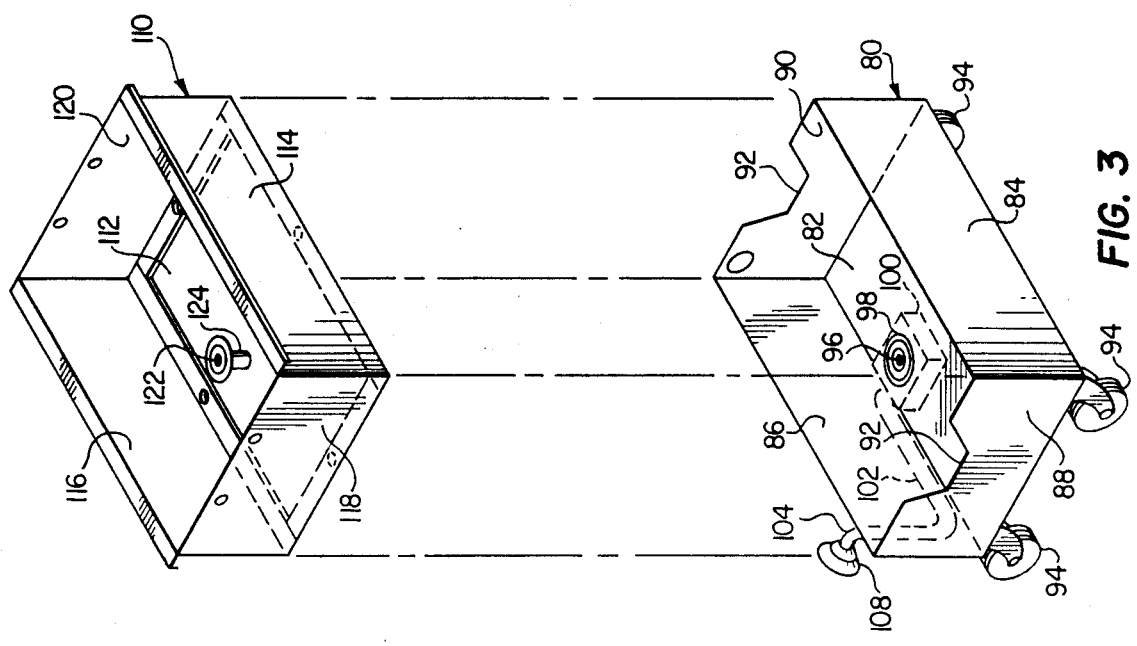
FIG. 3 is an exploded perspective view of interfitting cooking liquid container and overflow pan portions of the filtration and pumping system.

The apparatus 10 of the present invention is also provided with a substantially improved cooking liquid filtration and pumping system which requires no additional floor space beyond that occupied by the housing 12. As illustrated in FIGS. 1–3, the filtration and pumping system includes an open-topped, generally rectangularly configured overflow pan 80 having a bottom wall 82, front and rear side walls 84 and 86, and left and right side walls 88 and 90 having central cutout portions 92 formed in the top side edges thereof. The overflow pan 80 has support wheels 94 mounted thereon which permits the pan to be rolled along the floor 14. The bottom wall 82 of the support pan 80 has an outlet opening 96 formed therein and surrounded by a female O-ring slip fitting 98.

Secured to the underside of the bottom wall 82, beneath its outlet opening 96, is a drain sump 100 to which an inner end of a rigid transfer pipe 102 is connected. From its connection to the drain sump 100, the transfer pipe 102 is extended along the exterior of the rear overflow pan wall 86, the transfer pipe 102 having a rearwardly directed outer end portion 104 positioned adjacent the upper side edge of wall 86 and having secured thereto a female quick disconnect fitting portion 106. For purposes later described, the quick disconnect fitting portion 106 has secured thereto a rearwardly projecting, flared guide fitting member 108 having an open rear end.

A generally rectangular, open-topped cooking liquid receiving container 110 is nestingly inserted downwardly into the overflow pan 80, and has a bottom wall 112, front and rear side walls 114 and 116, and left and right side walls 118 and 120. An outlet opening 122 is formed through the bottom container wall 112 and communicates with the interior of a downwardly projecting male O-ring slip fitting member 124. When the container 110 is operatively inserted into the overflow pan 80, the O-ring slip fitting member 124 is received in the slip fitting member 98, the slip fitting members cooperating to prevent outflow of cooking liquid within the container 110 through its outlet opening 122 into the interior of the overflow pan 80. When the container 110 is lifted outwardly from the overflow pan 80, however, residual cooking liquid in the container 110 can flow through the container outlet opening 122 into the interior of the overflow pan. The overflow pan is preferably sized to contain, if necessary, the entire maximum volume of cooking liquid likely to be held in the container 110 (i.e., the entire cooking liquid content of one of the frypots) so that if a leak develops between the O-ring seal members 98 and 124, the cooking liquid leaking from the container 110 is safely captured in the overflow pan 80.

As illustrated in FIGS. 1 and 2, a flat, lift-out filter structure 126 is supported on the bottom container wall 112, and is operative to filter and clean cooking liquid flowing into the drain sump 100 from the interior of the container 110.

The filtration and pumping system also includes a filtration pump 130, having an associated drive motor 132, disposed within a lower rear portion of the housing 12, generally below the frypot cold wells 40. The outlet of the pump 130 is connected to a left end portion $52_a$ of the supply header 52 (FIG. 1) by a flexible supply conduit 134. For purpose later described, the inlet of the pump 130 has connected thereto a rearwardly projecting male quick disconnect fitting portion 136.

Figure 5:
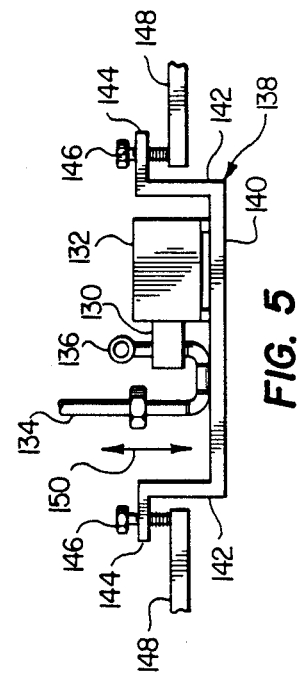
FIG. 5 is a reduced scale, simplified front elevational view of a height-adjustable mounting system used to support a pump portion of the cooking liquid filtration and pumping system.

As best illustrated in FIG. 5, the filtration pump 130 and its associated drive motor 132 are mounted on a support tray structure 138 having a base portion 140 with upstanding end portions 142 having upper ends from which support tab portions 144 outwardly extend. Four adjusting screw members 146 (only two of which are visible in FIG. 5) are threadingly received in suitable openings formed in the support tabs 144, and have lower ends which bear upon an internal frame portion 148 of the housing 12. The adjusting screw members 146 may be suitably rotated to vertically adjust the position of the support tray structure 138, and thus the vertical position of the quick disconnect fitting portion 136, within the housing as indicated by the double-ended arrow 150 in FIG. 5.

To ready the filtration and pumping system for operation, the overflow pan 80, with the cooking liquid receiving container 110 operatively received therein, is simply rolled rearwardly along the floor 14 into the access passage 34. The quick disconnect fitting portion 106 on the transfer pipe 102 is horizontally aligned with the quick disconnect fitting portion 136 on the pump 130 by means of guide rail members 150 (FIG. 1) secured to the interior housing side surfaces $34_a$ and $34_b$ which engage the opposite side surfaces 88 and 90 of the overflow pan 80 as it is being moved rearwardly into the access passage 34 to automatically effect horizontal alignment between the quick disconnect fitting portions 106 and 136. A corresponding vertical alignment between the quick disconnect fitting portions 106 and 136 may be achieved simply by raising or lowering the filtration pump 130 using the pump height adjustment means previously described.

Due to this alignment between the disconnect fitting portions 106 and 136, an automatic coupling of these fitting portions is achieved when the overflow pan 80 is moved rearwardly through the access passage 34 to the operating position of the overflow pan 80 illustrated in FIG. 2. The flared guide fitting 108 operates to facilitate this automatic coupling, and operates to receive and guide the male disconnect fitting portion 136 into the female disconnect fitting portion 106 as the overflow pan is being rolled rearwardly to its operating position. In such operating position of the overflow pan 80, and the cooking liquid receiving container 110 nested therein, the open discharge end 50 of the drainage outlet conduit 48 is positioned over the open top of the container 110 as illustrated in FIGS. 1 and 2.

The operation of the cooking liquid filtration and pumping system will now be described. For purposes of illustration, it will be assumed that the cooking liquid in the left frypot 36 in FIG. 1 is to drained, filtered and returned to such frypot. To initiate the filtering operation, the left drain valve 46 is opened, thereby permitting a gravity drainage flow 150 of cooking liquid sequentially from the left cold well 40 into the drain header 42, downwardly through the outlet conduit 48, and into the cooking liquid receiving container 110 through its open upper end. After the cooking liquid in the left fry pot 36 is drained into the container 110 in this manner, the left return valve 62 is opened, and the left supply valve 56 is moved, using its lever 70, to its "front" position (see FIG. 4). The pump motor 132 is then energized to draw cooking liquid within the container 110 downwardly into the drain sump 100 across the filter structure 126 to remove particulate food matter from the cooking liquid. The purified cooking liquid entering the sump 100 is drawn upwardly into the pump inlet via the transfer pipe 102. The filtered cooking liquid is then pumped upwardly through the flexible supply conduit 134, through the supply header 52 and downwardly to the left supply valve 56 through the pipe 54. The cooking liquid is then flowed upwardly through the conduit 60 (FIG. 2) to the left return valve 62, and to the quick disconnect fitting 66 through the pipe 64.

The filtered, returning cooking liquid passing inwardly through the left return valve 62 is flowed into the inlet portion 152 (FIG. 2) of a drop-in cooking fluid shower structure 154 removably positioned within the upper end of the left frypot 36. Shower structure 154 is of the type illustrated and described in U.S. Pat. No. 4,259,567 to Moore et al to which reference may be made for further detail relating thereto. However, for the sake of completeness, the shower structure 154 will be briefly described herein.

The inlet portion 152 is removably connected to the frypot quick disconnect fitting 66 (FIG. 2) and communicates at its upper end with a rectangular header section 156 that extends around the interior side wall surface of the left frypot 36 at its upper end. Header 156 has a pair of upwardly projecting handles 158 secured thereto and is provided around its lower side surface with a spaced series of small discharge openings 160 (FIG. 2).

Accordingly, when cooking liquid is forced upwardly into the header 156, it is discharged downwardly through the openings 160 in the form of small diameter cooking liquid jets 162 which flow along the interior side wall surfaces of the upper frypot section 38 and dislodge food particles adhering thereto so that they may be flowed downwardly into the well 40 and then transferred into the cooking liquid receiving container 110 to be trapped by the filter structure 126. Thus, with the left drain and return valves in their open position, a continuous cleansing flow of cooking fluid through the left frypot 36 and the filtering and pumping apparatus may be maintained until the circulating cooking liquid is sufficiently free of particulate food matter.

After the shower system has been operated for a predetermined length of time, the left supply valve actuating portion 68 may be rotated to its "rear" position to terminate flow to the shower system header 156 and divert the cooking liquid being discharged from the filtration pump into the bottom of the left cold well 40 to flush away (into the drainage conduit system) food particles disposed therein.

After this cooking liquid filtration process is complete, the left drain valve 46 may be closed to permit the pump 130 to completely refill the left frypot 36. The left return valve 62 may then be closed and the left fry pot returned to its cooking duties. This same filtration process may then be repeated for the cooking liquid disposed in the right frypot 36.

After the thorough filtering of the cooking liquid disposed in either or both of the illustrated frypots is completed, and the cleansed cooking liquid returned to the frypots, the cooking liquid receiving container is essentially empty. The filter structure 126, which has served both of the frypots 36, may then be quickly removed and cleaned simply by leftwardly rolling the overflow pan 80 (as viewed in FIG. 2) out of the access passage 34 and lifting the cooking liquid receiving container 110 out of the pan 80 as illustrated in FIG. 3.

When a particular batch of cooking liquid in either of the illustrated frypots 36 has reached the end of its useful life, it can simply be drained into the container 110 by opening the appropriate drain valve 46, and the overflow pan 80 rolled outwardly from beneath the frypots so that the used cooking liquid can be dumped and the entire container and pan structure cleaned.

It can readily be seen from the foregoing that the present invention provides a under-fryer cooking liquid filtration and pumping system which does not require additional floor space beyond that occupied by the housing 12. The filtration portion of the system is automatically connected to the pumping portion thereof in response to movement of the overflow pan 80 rearwardly into the access passage 34 to its operating position, the alignment of the mating disconnect fitting portions on the transfer pipe and the pump inlet being facilitated by the horizontal centering action of the guide rail 150 and the vertically adjustable mounting structure for the filtration pump.

While the aforementioned guide rails 150 are particularly effective in horizontally centering the overflow pan 80 as it is moved rearwardly into the access passage 34, it will be appreciated that, if desired, the guide rails could be positioned and configured to also vertically support the overflow pan 80 as it is moved rearwardly to its operating position within the housing 12.

It will also be appreciated that the ability to route the filtered cleaning liquid discharged from the filtration pump to either the previously described shower system in an upper portion of one of the frypots, or to a lower portion of one of the depending cold wells, provides for substantially improved removal of food particles and the like from the frypots during the overall cooking liquid filtration process.

The foregoing detailed description is to be clearly understood as being given by way of illustration and example only, the spirit and scope of the present invention being limited solely by the appended claims.

What is claimed is:

1. Deep fat frying apparatus comprising:
a floor supportable housing;
a frypot operatively supported in an upper portion of said housing, above the floor, and adapted to receive and heat a cooking liquid in which food items may be cooked;
drainage conduit means connected to said frypot for draining cooking liquid therefrom, said drainage conduit means having an inlet portion connected to said frypot to receive cooking liquid therefrom, and an outlet portion for discharging the received cooking liquid;

drainage valve means interposed in said drainage conduit means and operative to selectively initiate and terminate cooking liquid drainage from said frypot outwardly through said drainage conduit means;

supply conduit means for flowing cooking liquid from a source thereof into said frypot, said supply conduit means having an outlet portion connected to said frypot for discharging cooking liquid thereinto, and an inlet portion for receiving cooking liquid;

supply valve means interposed in said supply conduit means and operative to selectively permit or preclude flow of cooking liquid into said frypot through said supply conduit means; and cooking liquid filtration means for receiving cooking liquid discharged from said outlet portion of said drainage conduit means, filtering the discharged cooking liquid, and returning the filtered cooking liquid to said frypot through said supply conduit means, said cooking liquid filtration means including:

a cooking liquid filtration pump and associated drive motor mounted within a lower rear portion of said housing, said pump having an outlet operatively coupled to said outlet portion of said supply conduit means, and an inlet with a forwardly facing quick disconnect fitting portion operatively associated therewith, an open-topped overflow pan having a bottom wall, a side wall portion extending upwardly from around the entire periphery of said bottom wall, and an outlet opening formed in said bottom wall, said overflow pan being movable rearwardly into said housing to a rear position in which said overflow pan is disposed beneath said frypot, and movable forwardly out of said housing, support means for supporting said overflow pan in an elevated position relative to the floor during movement of said overflow pan rearwardly into and forwardly out of said housing, a cooking liquid receiving container, removably insertable downwardly into said overflow pan for movement therewith, for receiving cooking liquid discharged from said drainage conduit means when said overflow pan is in its rear position within said housing, said container being sized to receive the entire cooking liquid volume of said frypot and having a bottom wall with an outlet opening therein which, when said container is inserted in said overflow pan, communicates with said overflow pan outlet opening, a transfer pipe carried by said overflow pan for movement therewith and having an inlet end communicating with said overflow pan outlet opening, and an outlet end positioned rearwardly of said overflow pan, said transfer pipe outlet end having installed thereon a quick disconnect fitting portion positioned and configured to be operatively coupled to said quick disconnect fitting portion on said pump inlet in response to movement of said overflow pan to its rear position within said housing, and to be uncoupled from said quick disconnect fitting portion on said pump inlet in response to forward movement of said overflow pan away from its rear position, filter means, carried by said cooking liquid receiving container, for filtering cooking liquid discharged into said container from said drainage conduit means and flowing into said transfer pipe through said outlet openings in said container and said overflow pan, and cooperative seal means on said container and said overflow pan for preventing cooking liquid outflow through said outlet opening of said container into said overflow pan when said cooking liquid receiving container is operatively inserted into said overflow pan.

2. The deep fat frying apparatus of claim 1 wherein:
said cooking liquid receiving container is filled to a predetermined maximum level when said entire cooking liquid volume of said frypot is disposed therein, and
said outlet end of said transfer pipe is positioned above said predetermined maximum level to thereby prevent cooking liquid outflow through said transfer pipe outlet end when said overflow pan, with the filled cooking liquid receiving container operatively supported therein, is moved forwardly away from its rear position.

3. The deep fat frying apparatus of claim 1 wherein:
said overflow pan is also sized to hold the entire cooking liquid volume of said frypot.

4. The deep fat frying apparatus of claim 1 wherein:
said support means comprise wheel means operatively mounted on and projecting downwardly from said overflow pan.

5. The deep fat frying apparatus of claim 1 wherein said cooperating seal means include:
interengageable O-ring slip fittings formed on said container and said overflow pan at their outlet openings.

6. The deep fat frying apparatus of claim 1 wherein:
said apparatus further comprises an additional frypot operatively supported in said upper portion of said housing in a closely adjacent, side-by-side relationship with said first-mentioned frypot,
said drainage conduit means are additionally connected to said additional frypot,
said drainage valve means are additionally operative to selectively initiate and terminate cooking liquid drainage from said additional frypot,
said supply conduit means are additionally connected to said additional frypot,
said supply valve means are additionally operative to selectively permit or preclude flow of cooking liquid into said additional frypot, and
said overflow pan, in its rear position, extends beneath both of said frypots.

7. An under-fryer cooking liquid receiving and filtration structure horizontally movable into and out of a housing space beneath a housing-supported frypot to receive cooking liquid drained from the frypot, the housing having support therein a cooking liquid filtration pump having an inlet with a quick disconnect fitting portion operatively mounted thereon, said structure comprising:

a cooking liquid receiving container sized to receive and hold the entire operative volume of cooking liquid from said frypot and having a bottom outlet opening;

filter means, carried by said cooking liquid receiving container for filtering cooking liquid received by said container and flowing outwardly through said outlet opening therein;

an open-topped overflow pan having a bottom wall with an outlet opening formed therein, said overflow pan being sized to downwardly and removably receive said cooking liquid receiving container, and place said outlet opening of the received container in communication with said outlet opening of said overflow pan;

cooperating seal means on said cooking liquid receiving container and said overflow pan for preventing cooking liquid outflow through said container outlet opening into said overflow pan when said container is operatively received in said overflow pan; and a transfer pipe carried by said overflow pan for movement therewith and having an inlet end connected to said overflow pan outlet opening, and an outlet end having a quick disconnect fitting secured thereto and positioned to be operatively coupled to said quick disconnect fitting portion at said pump inlet in response to horizontal movement of said structure into the housing, and to be uncoupled from said quick disconnect fitting portion at said pump inlet in response to horizontal removal of said structure from the housing.

8. The structure of claim 7 wherein:

said cooking liquid receiving container is filled to a predetermined maximum level when the entire cooking liquid volume of said frypot is disposed therein, and said outlet end of said transfer pipe is positioned above said predetermined maximum level to thereby prevent cooking liquid outflow through said transfer pipe outlet end when said overflow pan in moved to an operative position thereof within the housing.

9. The structure of claim 7 wherein:

said overflow pan is sized to hold the entire cooking liquid volume of said frypot.

10. The structure of claim 7 wherein:

said overflow pan has support wheels mounted thereon and projecting downwardly therefrom to permit said overflow pan to be rolled along the floor into and out of said housing.

11. The structure of claim 7 wherein:

said cooperative seal means include interengageable O-ring slip fittings formed on said cooking liquid receiving container and said overflow pan adjacent their outlet openings.

12. Deep fat frying apparatus comprising:

a floor supportable housing;

a plurality of frypots mounted in a side-by-side relationship within said housing, each frypot being adapted to receive and heat a cooking liquid in which food items may be cooked and having a upper cooking portion from which a narrowed cold well portion depends, each frypot further having front and rear sides;

drainage conduit means connected to said cold well portions for draining cooking liquid therefrom;

drainage valve means interposed in said drainage conduit means and operative to initiate and terminate cooking liquid drainage from a selected one of said frypots;

supply conduit means connected to the upper cooking and depending cold well portions of each frypot for flowing cooking liquid from a source thereof to said frypots;

a plurality of supply valve means each associated with one of said frypots and connected in said supply conduit means, each of said supply valve means being operable to flow cooking liquid into a selected one of the upper cooking portion and depending cold well portion of its associated frypot; and shower means for receiving cooking liquid supplied to the upper cooking portion of each frypot via said supply conduit means and flowing the received cooking liquid downwardly along the interior side surface of the upper frypot cooking portion around its periphery.

13. The deep frying apparatus of claim 12 wherein:

said drainage conduit means are positioned generally forwardly of said depending cold well portions of said frypots, each of said supply valve means is positioned adjacent a rear side portion of the cold well of its associated frypot and is mechanically actuatable to selectively flow cooking liquid to the cold well portion or the upper cooking portion of its associated frypot, and said apparatus further comprises mechanical linkage means, interconnected between said drainage conduit means and said supply valve means, for actuating said supply valve means.

14. The deep fat frying apparatus of claim 13 wherein:

each of said supply valve means has a rotatable actuating member, and said mechanical linkage means include a plurality of control levers rotatably carried by said drainage conduit means, and a plurality of elongated rod means each interconnected between one of said control levers and one of said actuating members to transfer rotational force from the control lever to the actuating member.

15. Deep fat frying apparatus comprising:

a floor supportable housing having an upper interior portion, a lower interior portion, a front side, a rear side, and means for defining a passage extending upwardly from the floor and rearwardly into said lower interior portion through said front side, said passage being horizontally bounded by spaced apart left and right vertically extending side surface portions of said housing;

a frypot mounted in said upper interior housing portion above said passage and adapted to receive and heat a cooking liquid in which food items may be cooked;

drainage conduit means connected to said frypot for draining cooking liquid therefrom, said drainage conduit means having an outlet portion disposed within said housing adjacent an upper portion of said passage;

cooking liquid receiving container means movable rearwardly into said passage to an operating position in which said container means are disposed beneath said outlet portion of said drainage conduit means to receive cooking liquid discharged therefrom, and movable forwardly out of said passage, said container means having an outlet opening to which an inlet end of a transfer pipe is connected to receive cooking liquid flowing outwardly through said container means outlet opening, said transfer pipe having a rearwardly facing outlet end positioned externally of a rear portion of said container means, said outlet end of said transfer pipe having a rearwardly facing first quick disconnect fitting portion thereon;

filter means, carried by said container means, for filtering cooking liquid flowing outwardly from said container means through said outlet opening thereof;

a filtration pump mounted within a lower rear portion of said housing, said filtration pump having an outlet, and an inlet to which a forwardly facing second quick disconnect fitting portion is secured, said second quick disconnect fitting portion being couplingly engagable with said first quick disconnect fitting portion and being generally positioned within said housing to be engaged and removably coupled with said first quick disconnect fitting portion as said container means are moved rearwardly through said passage to their operating positions;

supply conduit means interconnected between said frypot and said filtration pump outlet for flowing cooking liquid from said filtration pump outlet into said frypot;

first alignment means, carried by said housing, for bringing said first and second quick disconnect fitting portions generally into horizontal alignment as said container means rearwardly approach their operating positions; and second alignment means for bringing said first and second quick disconnect fitting portions generally into vertical alignment as said container means rearwardly approach their operating position, said second alignment means including means for selectively adjusting the height of said filtration pump within said housing.

16. The deep fat frying apparatus of claim 15 wherein:
said cooking liquid receiving container means are wheel-supported for rolling movement along the floor into and out of said passage, and said first alignment means include rail means, projecting horizontally inwardly from said left and right vertically extending side surface portions of said housing, for engaging and guiding opposite side surfaces of said container means during rearward movement of said container means into said passage.

17. The deep fat frying apparatus of claim 15 wherein:
said filtration pump is carried on a mounting tray structure positioned within said housing and carried by a support portion of said housing, and
said second alignment means include means for selectively adjusting the height of said mounting tray structure relative to said housing.

18. The deep fat frying apparatus of claim 17 wherein:
said mounting tray structure is secured to said housing support portion by screw means which may be rotated to selectively adjust the height of said mounting tray structure relative to said housing support portion.

19. The deep fat frying apparatus of claim 15 wherein:
one of said first and second quick disconnect fitting portions has a flared guide fitting secured thereto and configured to receive the other of said first and second quick disconnect fitting portions, during rearward movement of said container means toward their operating position, and guide said other of said first and second quick disconnect fitting portions into removable coupling engagement with said one of said first and second quick disconnect member portions.

20. The deep fat frying apparatus of claim 19 wherein:
said first quick disconnect member portion is a female quick disconnect member portion,
said second quick disconnect member portion is a male quick disconnect member portion, and
said flared guide fitting is secured to said first quick disconnect member portion.

* * * * *

UNITED STATES PATENT AND TRADEMARK OFFICE
CERTIFICATE OF CORRECTION

PATENT NO. : 4,974,501

DATED : Dec. 4, 1990

INVENTOR(S) : James T. Grob and John M. Kinch

It is certified that error appears in the above-identified patent and that said Letters Patent is hereby corrected as shown below:

ON TITLE PAGE: Abstract,
   Line 21, "interenagable" should be --interengagable--.

Col. 1, line 11, "4,890,598" should be --4,890,548--.

Col. 7, line 32, "female 0" should be --female O--.

Signed and Sealed this

Twenty-ninth Day of September, 1992

Attest:

DOUGLAS B. COMER

Attesting Officer     Acting Commissioner of Patents and Trademarks